Oct. 24, 1961 G. BRUCK 3,005,860

THERMOELECTRIC GENERATOR

Filed Aug. 22, 1960

INVENTOR.
GEORGE BRUCK.
BY Alden D. Redfield.
Charles M. Hogan.
ATTORNEYS.

United States Patent Office 3,005,860

Patented Oct. 24, 1961

3,005,860
THERMOELECTRIC GENERATOR

George Bruck, Cincinnati, Ohio, assignor to Avco Corporation, Cincinnati, Ohio, a corporation of Delaware Filed Aug. 22, 1960, Ser. No. 50,973
1 Claim. (Cl. 136—4)

The present invention relates to thermoelectric generators, and, while not limited thereto, it is of particular utility in providing a power supply for tunnel diodes.

The advent of the Esaki (tunnel) diode posed a problem in power supplies of major proportion. The successful operation of this device depends upon a millivolt power source with an internal impedance in the low milliohm range. The power source of constant voltage should be capable of supplying amperes of current on demand.

A conventional method of supplying D.C. power is to transform an alternating current voltage and then to rectify and filter it. Disadvantages of this method are low efficiency, high series impedance, and regulation requirements.

The elementary approach of loading down batteries to obtain low voltage, low resistance constant potential source is objectionable particularly in all-electric equipment. Likewise, the rectification of A.C. power and filtering to supply the few milliamperes required by Esaki diodes is uneconomical. A power supply operating directly from the power lines is desirable, and the present invention provides it.

The primary object of the present invention is to provide a low-voltage, low-source impedance power supply characterized by compactness, ease of manufacture, and low cost.

The principal objective achieved by this invention is a power supply delivering up to about 0.3 of a volt per thermocouple with an internal resistance in the order of 50 milliohms. Another important objective is to provide a generator of increased efficiency with multiple junctions driven from a common heater element. The illustrative embodiment herein discussed contains two thermocouples in series, providing a constant voltage on the order of 0.6 maximum with a total internal resistance much less than 100 milliohms. Any reasonable number of thermocouples may be stacked and connected to give either increased voltage or multiple power sources. The current obtainable per thermocouple is on the order of amperes.

The generator described employs a metal base 10 of high thermal conductivity both as a support and as a heat sink. The generator base 10 may be mounted on some other heat sink of high capacity, such as the equipment chassis. Uprights are mounted on the base in a manner to provide good thermal conduction and the required electric insulation. The thermoelectric generating elements are suspended between these uprights and are stacked vertically with the heater in the center, so that a number of hot junctions are excited from a common heater element. Junctions assembled in the manner described and so excited provide greatly enhanced efficiency.

For a better understanding of the invention, together with other objects, advantages, and capabilities thereof, reference is made to the following description of the appended drawings, in which.

Figure 1:
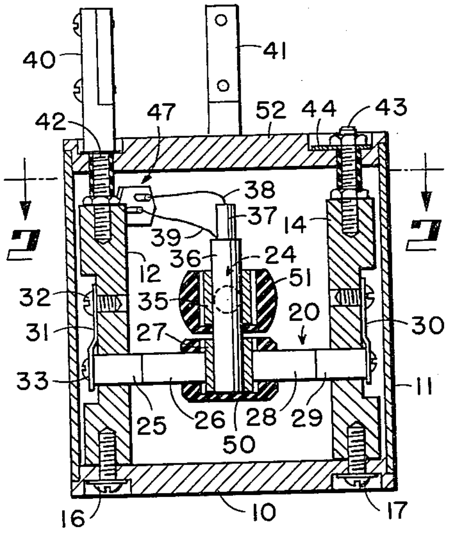
FIG. 1 is an elevational sectional view of a thermoelectric generator in accordance with the invention as taken along section line 1—1 of FIG. 2, looking in the direction of the arrows.
Figure 2:
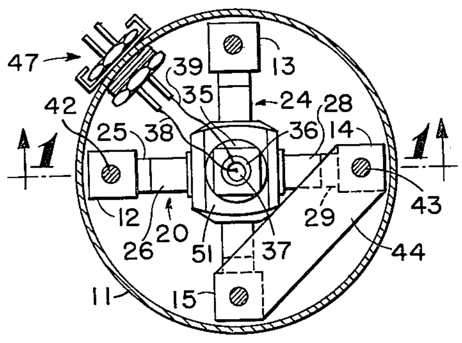
FIG. 2 is a sectional view as taken along the line 2—2 of FIG. 1, looking in the direction of the arrows.

Referring now to FIGS. 1 and 2, there is shown a metallic base 10, intended to be mounted on a larger metallic base of high thermal conductivity, which serves as a heat sink to maintain low temperature on the cold junctions. Secured to the base 10 is a cylindrical metallic housing 11. Mounted within the housing 11 and secured to the base 10 are 90-degree displaced metallic columns or uprights 12, 13, 14, and 15, which are secured in place as by screws 16 and 17. These uprights are made of material exhibiting high thermal conductivity.

Considering now the thermoelectric unit 20, a series of thermal junctions is supported in a spring compression assembly by the uprights 12 and 14. That is to say, there is a cold junction between upright 12 and material 25, a hot junction between material 26 and metallic sleeve 27, a hot junction between metallic sleeve 27 and material 28, and a cold junction between material 29 and upright 14. Materials suitable for the elements 25, 26, 28, and 29 are well known to those skilled in the thermoelectric generator art and need not be described in detail herein. The cylindrical-shaped pellets of material 25, 26, 28, and 29 are axially aligned and maintained in spring-compressed assembly by biasing springs 31 and 30. The fixed end of spring 31 is secured to upright 12 by a screw 32, and its free or flexing end is secured to pellet 25 by screw 33. Spring 30 is arranged in a manner similar to spring 31.

The thermoelectric generating unit 24 is generally similar to unit 20 but is mounted vertically above and at right angles thereto. The unit 24 includes a metallic sleeve 35, similar to sleeve 27.

Concentrically disposed within axially aligned sleeves 27 and 35 is a ceramic cylinder 36, within which is concentrically disposed a heating element 37. The heating element has conductive leads 38 and 39 which are connected to the terminals of a power plug 47, and plug 47 is inserted in a socket of a suitable source of energy.

The housing 11 is closed by a metallic lid 52, on which are mounted terminals 40 and 41. Terminal 40 is secured mechanically and conductively to upright 12 by a screw 42, and terminal 41 is similarly secured to upright 13. Uprights 14 and 15 are secured in place by screws such as 43 and are encircuited by a conductive metallic strip 44, so that a circuit is traced as follows: terminal 40, upright 12, thermoelectric unit 20, upright 14, conductive strip 44, upright 15, thermoelectric unit 24, upright 13, and terminal 41.

Thus it will be seen that the two thermoelectric units are connected in series and brought out to external terminals 40 and 41. Further, all hot junctions are excited by a common heating element 37.

It will be understood that the electrical circuitry just traced is suitably insulated from the housing, heat sink, and lid elements by proper insulating expedients, well known to those skilled in the art and involving details not desirably shown herein.

In order to maintain the hot junctions at an elevated temperature, they are located within ceramic thimbles 50 and 51. Thimble 50 is formed of suitable material such as soapstone, in cylindrical shape, with a closed end at the bottom and an open end on top, and is suitably machined or fabricated slidably to receive the pellets 26 and 28 and concentrically to receive sleeve 27. Thimble 51 is similarly arranged.

Thermoelectric generating couples are per se well known to those skilled in the art, and such couples and suitable materials for same are described in the literature—for example, "Semiconductor Materials for Thermoelectric Power Generation up to 700C," page 450 et seq. of Electrical Engineering, June 1960, published by the American Institute of Electrical Engineers, New York; and the articles entitled "Operating Properties of Thermoelectric Generator Materials" and "Synthesis of Thermoelectric Generators" at pages 470 et seq. and 476 et seq. of the same issue.

The thermoelectric generator in accordance with the present invention is of particular advantage in providing power for a tunnel diode, often referred to as an Esaki diode, well described in an article entitled "Tunnel Diodes," Electrical Design News, published May 1960 by the Rogers Publishing Co., 85 W. Harrison Avenue, Chicago 5, Illinois, at pages 50–77.

Figure 3:
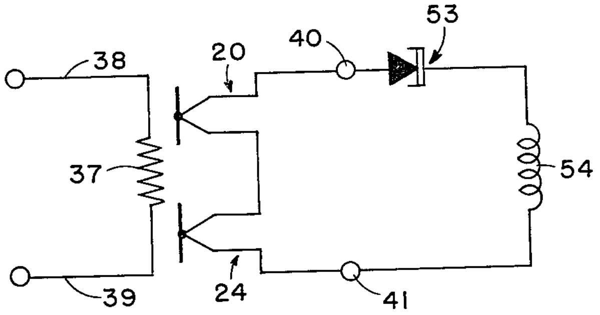
FIG. 3 is a circuit diagram showing the invention as incorporating a thermoelectric generator and tunnel diode amplifier circuit.

In FIG. 3 there is shown, in combination, a tunnel diode 53 as embodied in a relaxation oscillator circuit powered by a thermoelectric generator in accordance with the present invention. The oscillator circuit comprises Esaki diode 53, inductance 54, and the resistance of the thermocouples 20 and 24. It will be understood that the utility of the thermoelectric generator in accordance with the invention is not limited to Esaki diodes, nor is it limited to the particular diode circuitry illustrated in FIG. 3.

While there has been shown and described what is at present considered to be the preferred embodiment of the invention, it will be understood by those skilled in the art that various changes and modifications may be made therein without departing from the true scope of the invention as defined in the appended claim.

Having described my invention, I claim:

A thermoelectrical generator comprising: a heat sink formed as a supporting base; a cylindrical metallic housing secured in upright relation to the heat sink; a first pair of metallic uprights mounted on the base member and disposed in diametric opposition to each other; a second pair of metallic uprights mounted on the base member and disposed in diametric opposition to each other, said second pair being angularly displaced from the first pair of uprights by ninety degrees; a first metallic sleeve disposed in concentric relation to the uprights; a second metallic sleeve disposed in concentric relation to the uprights and vertically displaced from the first sleeve; a first series pair of metallic elements between the first sleeve and one of the first pair of uprights; a second pair of metallic elements between the first sleeve and the other one of said first pair of uprights; a third pair of metallic elements between the second sleeve and the first one of said second pair of uprights; a fourth pair of metallic elements between the second sleeve and the other of said second pair of uprights, each series arrangement of sleeve and pair of metallic elements and upright comprising materials forming a hot thermal junction adjacent the sleeve and a cold thermal junction adjacent the upright; a first ceramic thimble embracing the hot junctions adjacent the first sleeve; a second ceramic thimble embracing the hot junctions adjacent the second sleeve; an electrical heater element common to all of the hot junctions and projecting through both of said sleeves; individual end terminals connected to one upright of each pair of uprights and an electrical connection between the remaining uprights to provide a series arrangement of all of said junctions; and leaf springs individual to each pair of metallic elements and the associated uprights for biasing the associated pair of metallic elements into a secure position.

References Cited in the file of this patent

UNITED STATES PATENTS

| | | |
|---|---|---|
| 775,188 | Lyons et al. | Nov. 15, 1904 |
| 2,122,262 | Nergaard | June 28, 1938 |
| 2,232,961 | Milnes | Feb. 25, 1941 |
| 2,913,510 | Birden et al. | Nov. 17, 1959 |
| 2,930,904 | Fritts | Mar. 29, 1960 |
| 2,956,267 | Matthews | Oct. 11, 1960 |
| 2,976,426 | Rappaport | Mar. 21, 1961 |